United States Patent [19]
Kaburagi et al.

[11] Patent Number: 6,027,197
[45] Date of Patent: *Feb. 22, 2000

[54] RECORDING APPARATUS FOR EFFECTING MULTI-PASS PRINTING

[75] Inventors: Yoshiaki Kaburagi; Sohei Tanaka; Masafumi Wataya, all of Kawasaki; Noriyuki Suzuki, Tokyo; Hiroshi Uemura, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,813

[22] Filed: Jun. 30, 1997

Related U.S. Application Data

[63] Continuation of application No. 08/280,459, Jul. 26, 1994, abandoned.

[30] Foreign Application Priority Data

Sep. 30, 1993 [JP] Japan .................................... 5-244744

[51] Int. Cl.⁷ ...................................................... B41J 29/38
[52] U.S. Cl. .................................................. 347/9; 347/41
[58] Field of Search .................................. 347/9, 12, 37, 347/41, 180–182

[56] References Cited

U.S. PATENT DOCUMENTS

| | | |
|---|---|---|
| 4,159,882 | 7/1979 | Sanders, Jr. et al. .................... 400/555 |
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,543,644 | 9/1985 | Kozima et al. .......................... 711/104 |
| 4,558,333 | 12/1985 | Sugitani et al. . |
| 4,608,577 | 8/1986 | Hori . |
| 4,653,941 | 3/1987 | Suzuki ............................... 400/124.02 |
| 4,723,129 | 2/1988 | Endo et al. . |
| 4,740,796 | 4/1988 | Endo et al. . |
| 5,102,244 | 4/1992 | Takeda ............................... 400/124.07 |
| 5,359,355 | 10/1994 | Nagoshi et al. ............................ 347/9 |
| 5,500,661 | 3/1996 | Matsubara et al. ........................ 347/41 |
| 5,539,434 | 7/1996 | Fuse ........................................... 347/19 |

FOREIGN PATENT DOCUMENTS

| | | |
|---|---|---|
| 0310217 | 4/1989 | European Pat. Off. . |
| 0-526186 | 2/1993 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 60-172548 | 9/1985 | Japan . |
| 61-015460 | 1/1986 | Japan . |

*Primary Examiner*—John E. Barlow, Jr.
*Assistant Examiner*—Craig A. Hallacher
*Attorney, Agent, or Firm*—Fitzpatrick, Cella, Harper & Scinto

[57] ABSTRACT

A recording apparatus records an image on a recording medium by scanning by a recording head. Mask data for masking record data is set in registers, a record timing signal synchronized with the scan of the recording head is counted up by a counter, and the mask data set in the registers is selected by selectors in accordance with the count. The selected mask data is logically ANDed with the record data to drive the recording head. A load to software is reduced and the recording is attained while the record data is masked with a simple construction.

8 Claims, 17 Drawing Sheets

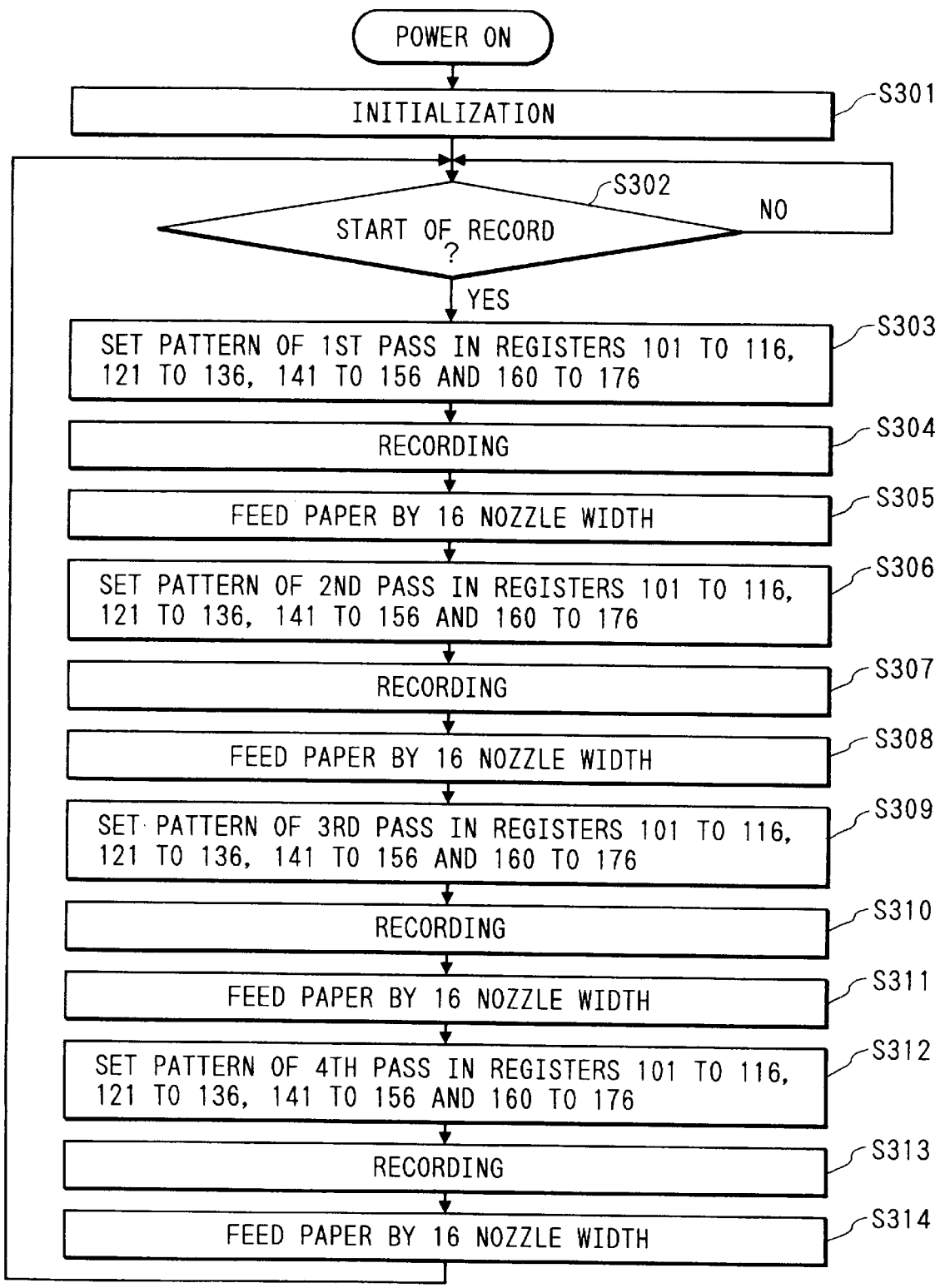

RECORDING APPARATUS FOR EFFECTING MULTI-PASS PRINTING

This application is a continuation of application Ser. No. 08/280,459, filed Jul. 26, 1994, now abandoned.

BACKGROUND OF THE INVENTION

1. Field of the Invention

The present invention relates to a recording apparatus which scans a recording head to record an image on a recording medium.

2. Related Background Art

A printer which records characters and images on a sheet material (recording medium) such as a record sheet or plastic sheet has been known, and an image forming process adopted in such a printer includes a wire dot system, an ink jet system and a laser beam system. Such a printer includes a serial type in which a carriage carrying a recording head is scanned to record, a line print type in which a line head is used to print by line and a page print type in which recording is made by page. Of those, in a serial ink jet printer, an ink jet head (recording head) is mounted on a carriage which is laterally and reciprocally driven by a carriage motor along a longitudinal direction of a platen, and the ink jet head is driven in synchronism with the scan of the carriage so that ink is discharged from ink discharge nozzles to form an image on a record sheet.

As a demand for high quality recording recently increases, the recording head becomes more and more high density and an ink jet printer equipped with an ink jet head (recording head) having nozzles (recording elements) of 360 dots per inch (dpi) has become common, and plain papers as well as the sheet material specially designed for the ink jet are permitted for printing. As the recording density of the recording head increases, a process of receiving image data in bit form and recording it in graphic has become common.

In order to record such graphic data with a high quality by a serial printer, white stripes or black stripes which appear along the reciprocal movement direction of the carriage (main scan direction) and along a sub-scan direction orthogonal to the main scan direction should be prevented. Where the printer is a color printer, the generation of color irregularity in the recorded image should also be prevented.

When printing is made on a recording medium such as a plain paper or an OHP sheet, the absorption of ink is worse than the sheet specially designed for the ink jet so that a time for the ink to be fixed on the recording medium should be reserved. To this end, a density of ink deposited on the recording medium in a predetermined time must be reduced. However, in the color printer, since inks of different colors are recorded at the same position, it is difficult to lower the ink density below a certain level.

In order to solve the above problem, as shown in FIG. 16, nozzles of a recording head having 64 nozzles are divided into L blocks (L=4, L≧22 in FIG. 16) and a recording medium is transported along the sub-scan direction for each block of the divided nozzles. The recording head is reciprocally scanned along the main scan direction L times to record an image of a width (band) which can be recorded by one scan of the recording head to accomplish so-called multi-pass recording. In FIG. 16, numeral 800 denotes recording in a first pass, and the recording head is positioned at that position. Numeral 801 denotes a second pass at which the recording medium is transported by 16-nozzle length along the sub-scan direction. Similarly, numeral 802 denotes a third pass, numeral 803 denotes a fourth pass and numeral 804 denotes a fifth pass.

Since recording is to be made at different positions on the recording medium by using different nozzles in the respective passes, a continuous repetitive pattern of M×N dots (16×16 in FIGS. 17 to 20) is prepared for each record pass as shown in FIGS. 17 to 20 and recording is made while the record data is masked for each record pass. FIG. 17 shows a first pass pattern, FIG. 18 shows a second pass pattern, FIG. 19 shows a third pass pattern and FIG. 20 shows a fourth pass pattern. In FIGS. 17 to 20, when recording data are on black dot positions, ink is discharged from the corresponding nozzles, and at white dot positions, the discharge of the ink is masked even if the record data is on those positions and the ink is not discharged. Optimum size of the repetitive pattern (the values of M and N) and the mask pattern thereof may differ from printer to printer or from record mode to record mode. In the past, such mask operation has been conducted by software. In addition, the data transfer from a memory which stores the record data to the recording head has also been conducted by software.

In the prior art apparatus, since the mask operation to control the discharge of ink from the nozzles of the recording head and the data transfer operation were conducted by software, the following disadvantages were included:

(1) Since the operation of the mask data is required when the record data is to be outputted, the load to the software increases and high speed recording cannot be attained.

(2) The record data of one-pass must be prepared by the mask operation before the carriage is scanned for recording. As a result, a memory area to store an additional line of record data is required and a cost is increased.

(3) Since the mask operation and the data transfer operation are conducted by software, the software processing time increases and an effective recording speed (throughput) is lowered.

SUMMARY OF THE INVENTION

In the light of the above, it is an object of the present invention to provide an improved recording apparatus.

It is another object of the present invention to provide a recording apparatus which reduces a load to software and records an image by masking record data with a simple construction.

It is still another object of the present invention to provide a recording apparatus which generates a record timing signal in synchronism with recording scan by a recording head, selects mask data set in mask setting means for setting mask data for masking record data, and logically ANDs the selected mask data and the record data to drive the recording head.

It is still another object of the present invention to provide a recording apparatus which improves a throughput when an image is recorded by effecting recording scans a plurality of times for one area.

It is still another object of the present invention to provide a recording apparatus which sets a record address of storage means in setting means for each block of recording heads and DMA transfers record data to recording means by control means independently for each block in accordance with the set address.

The above and other objects of the present invention will be apparent from the accompanying drawings and the following description.

BRIEF DESCRIPTION OF THE DRAWINGS

FIGS. 4-1 to 4-3 show a linear encoder detection signal and a head drive pulse in the ink jet printer of the embodiment, FIG. 8 shows a flow chart of an operation in a color ink jet printer in accordance with other embodiment of the present invention, FIGS. 14-1 to 14-20 show timing charts illustrating timings of signals in the block circuit diagrams of FIGS. 11 and 12, FIG. 15 shows a perspective view of a configuration of a color ink jet printer, FIG. 16 illustrates the movement of a recording head in 4-pass recording adopted in the embodiment, FIG. 17 shows a mask pattern for a first pass in the embodiment, FIG. 18 shows a mask pattern for a second pass, FIG. 19 shows a mask pattern for a third pass, and FIG. 20 shows a mask pattern for a fourth pass.

DETAILED DESCRIPTION OF THE PREFERRED EMBODIMENTS

[Embodiment 1]

Figure 1:
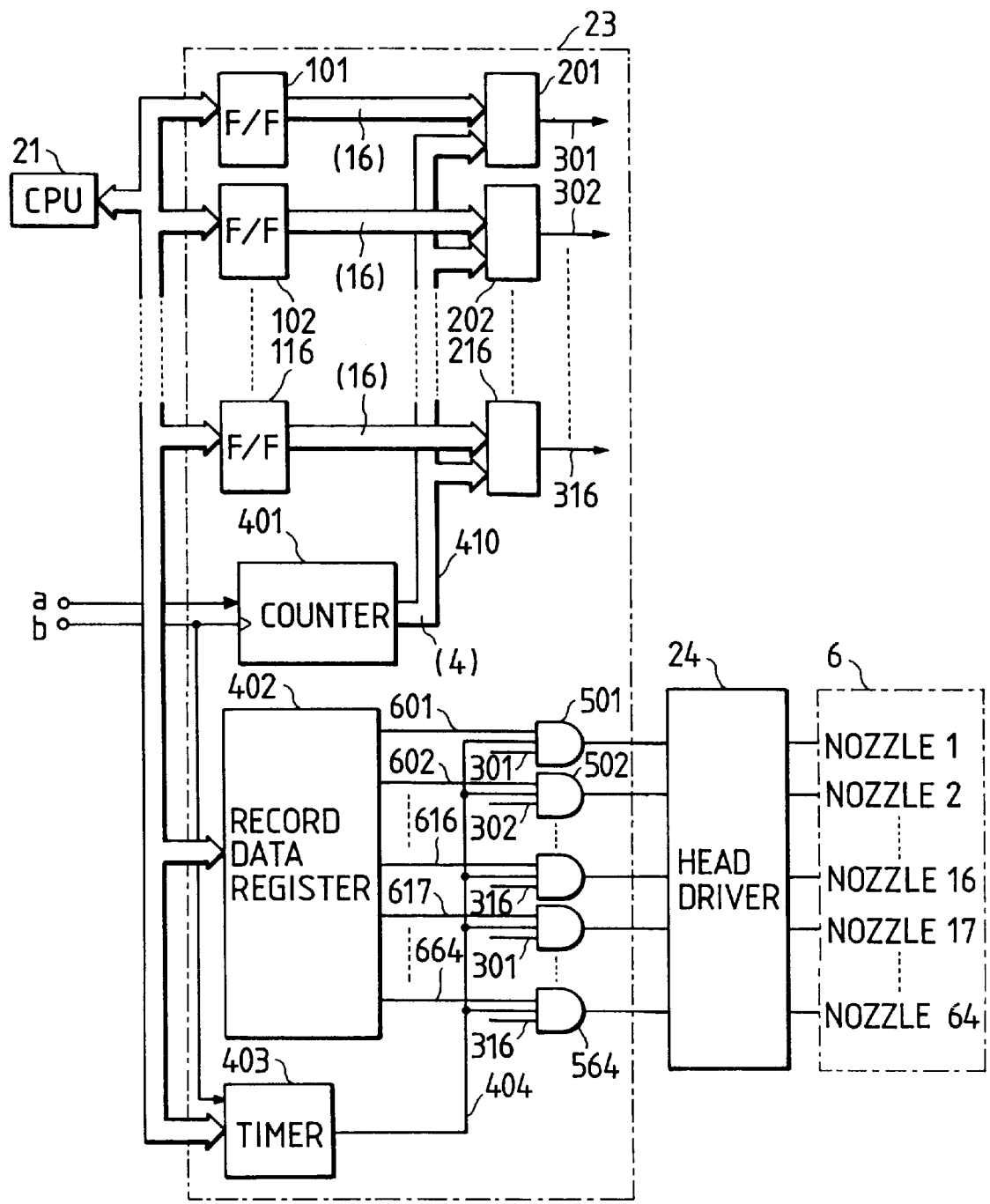
FIG. 1 shows a block diagram of a configuration of a heat control unit of an ink jet printer in accordance with an embodiment of the present invention.

Referring to the drawings, a preferred embodiment of the present invention is explained in detail. Prior to the explanation of the operation of the present embodiment, reference is made to FIG. 2 to explain about a serial ink jet printer of the present embodiment.

Figure 2:
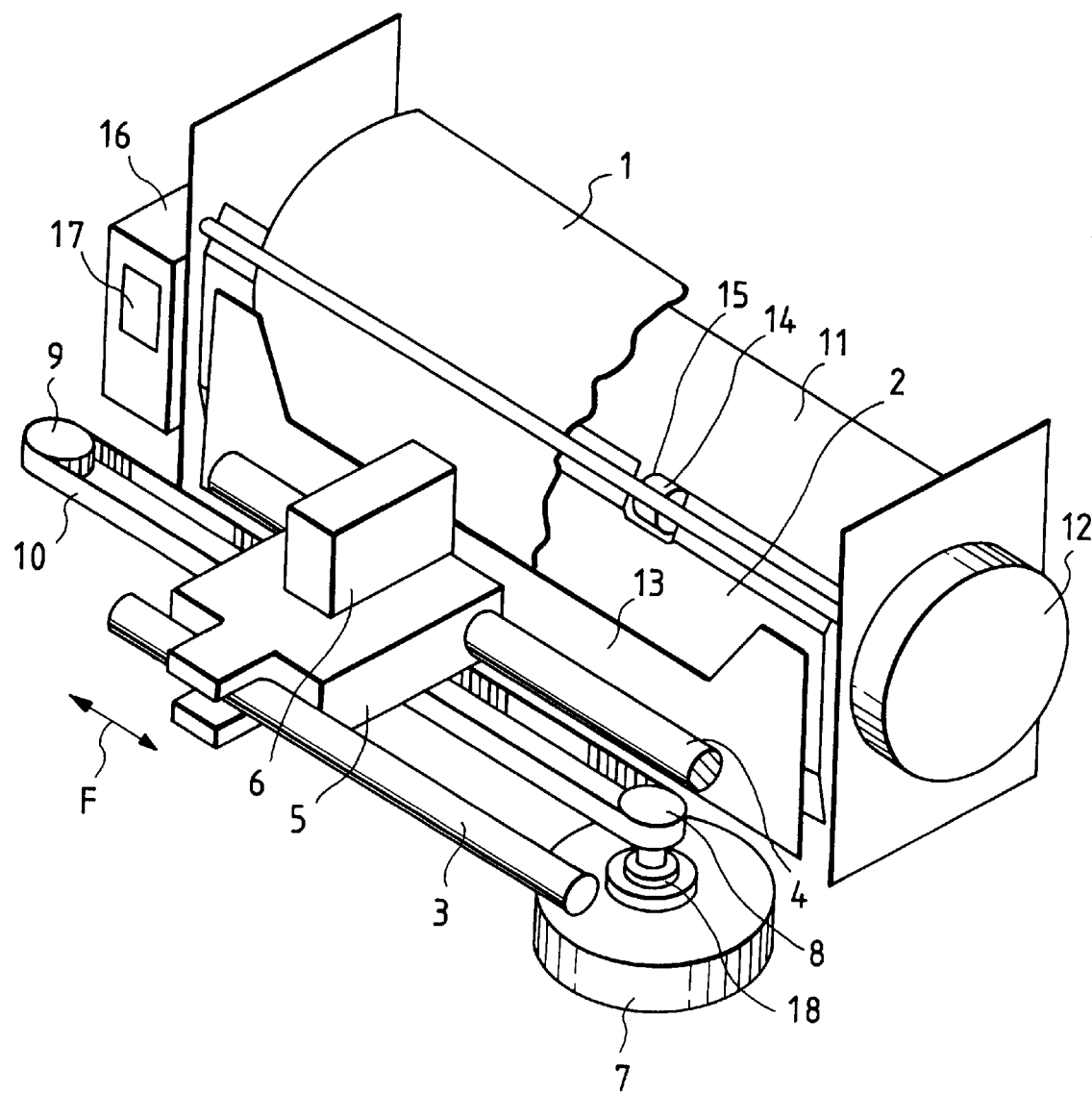
FIG. 2 shows a perspective view of a recording unit of the ink jet printer of the embodiment.

In FIG. 2, a carriage 5 which is laterally and reciprocally driven along a guide shaft 3 arranged in parallel to a platen 2 for backing up a sheet (a recording medium such as a recording sheet or plastic sheet) 1 is arranged in front of the platen 2. A recording head 6 for recording an image on the sheet 1 in accordance with the record data is mounted on the carriage 5. In the present embodiment, the recording head 6 is an ink jet head having 64 nozzles. The carriage 5 is fixed to a timing belt 10 which is wound around a pulley 8 driven by a carriage motor 7 and a follower pulley 9, and reciprocally driven along the main scan direction (arrow F) by the rotation of the carriage motor 7. Recording is made in each of forward run and return run of the reciprocal movement.

The sheet 1 is inserted along a paper pan 11 and fed to a record station between the recording head 6 and the platen 2 by a sheet feed roller (not shown) which is driven by a sheet feed motor 12. The sheet 1 fed to the record station is press-contacted to the platen (stationary flat platen) 2 by a sheet retainer 13. The sheet 1 passed through the record station is fed and ejected by an eject roller 14 and a roller 15 which are synchronously driven by a sheet feed roller (not shown).

A head recovery unit 16 comprising a cap 17 which is attached to and detached from an orifice surface of the recording head 6 and ink suction means is provided at a home position beyond a recording range of the recording head 6. In recording, as the carriage 5 is scanned along the main scan direction, ink droplet discharge means of the recording head 6 is driven in accordance with record data in synchronism with a signal generated by a rotary linear encoder 18 arranged in parallel with a guide shaft 4 so that the ink droplets discharged from orifices in the nozzles are deposited onto the sheet 1 to form a dot pattern.

After the recording the recording head 6 is stopped at the home position and the orifice plane of the recording head 6 is closed by the cap 17 of the ink recovery unit 16.

Figure 3:
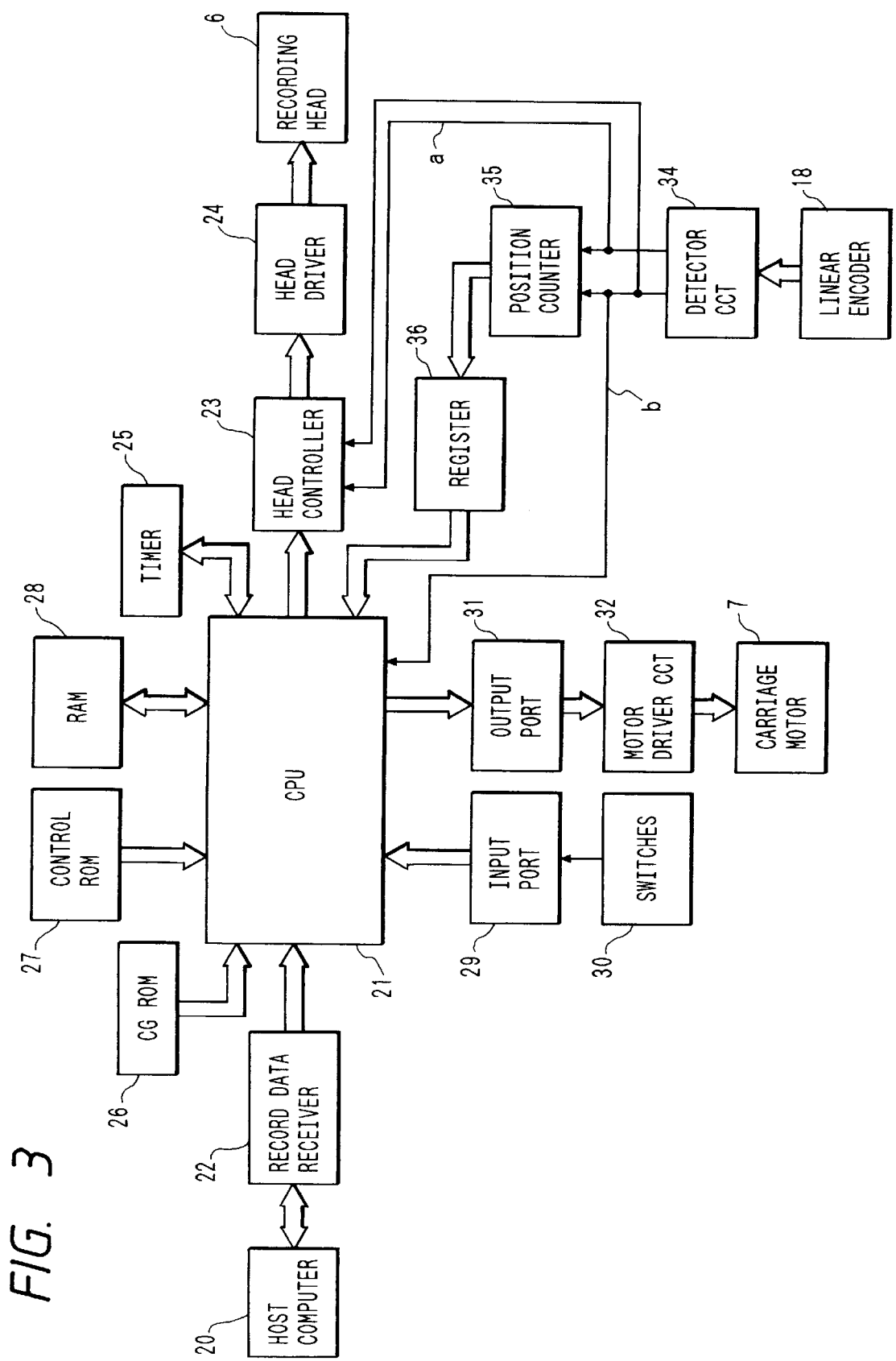
FIG. 3 shows a block diagram of a configuration of the ink jet printer of the embodiment.

FIG. 3 shows a block diagram of a configuration of the ink jet printer of FIG. 2.

In FIG. 3, a CPU (central processing unit) 21 of the printer is connected to a host computer 20 through a record data receiving unit 22 to receive command data and character data from the host computer 20. The CPU 21 comprises a timer 25 for controlling a timing of a process operation, a font ROM (CG ROM) 26 for storing fonts of characters and symbols, a control ROM 27 for storing a control program of the CPU 21 and various data and a receiving buffer, and a RAM 28 to be used as a work area of the CPU 21 is connected thereto.

Thus, the CPU 21 controls the rotation of the carriage motor 7 and the sheet feed motor 12 through an output port 31 and a motor drive circuit 32 in accordance with commands data and record data transferred from the host computer 20 and various signals supplied from various switches 30 arranged on a console panel through an input port 29, and also outputs record data to the recording head (ink jet head) 6 through a head control unit 23 and a head drive unit 24 to control the record operation.

Figure 4:
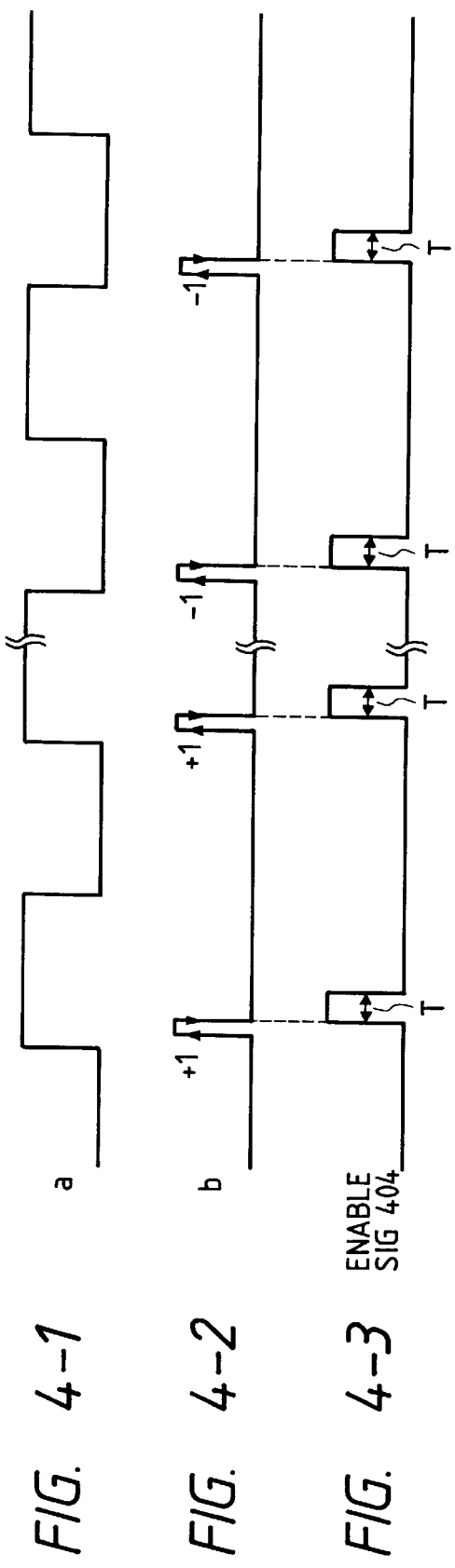

The timer 25 generates various timings to be used for switching the excitation of the carriage motor 7 and the sheet feed motor 12. An output signal of the rotary encoder 18 used to determine the scan position of the recording head 6 and the drive timing of the recording head 6 is supplied to a detection circuit 34 which produces a direction signal a and a count signal b as shown in FIGS. 4-1 and 4-2. The direction signal a and the count pulse b are supplied to a position counter 35 which is an up/down counter and read into the CPU 21 as position information of the recording head 6 through a register 36 and also applied to the head control unit 23 for use as an up/down signal of an up/down counter 401 (which will be described later in conjunction with FIG. 1). Further, the count pulse b is used as an interruption signal to the CPU 21, which, in response to the interruption signal, writes record data to a record data register 402 (see FIG. 1) provided in the head control unit 23.

FIG. 1 shows a block diagram of a configuration of the head control unit 23 of the printer of the present embodiment. Similar elements to those of the previous drawing are designated by the like numerals and the explanation thereof is omitted.

Figure 5:
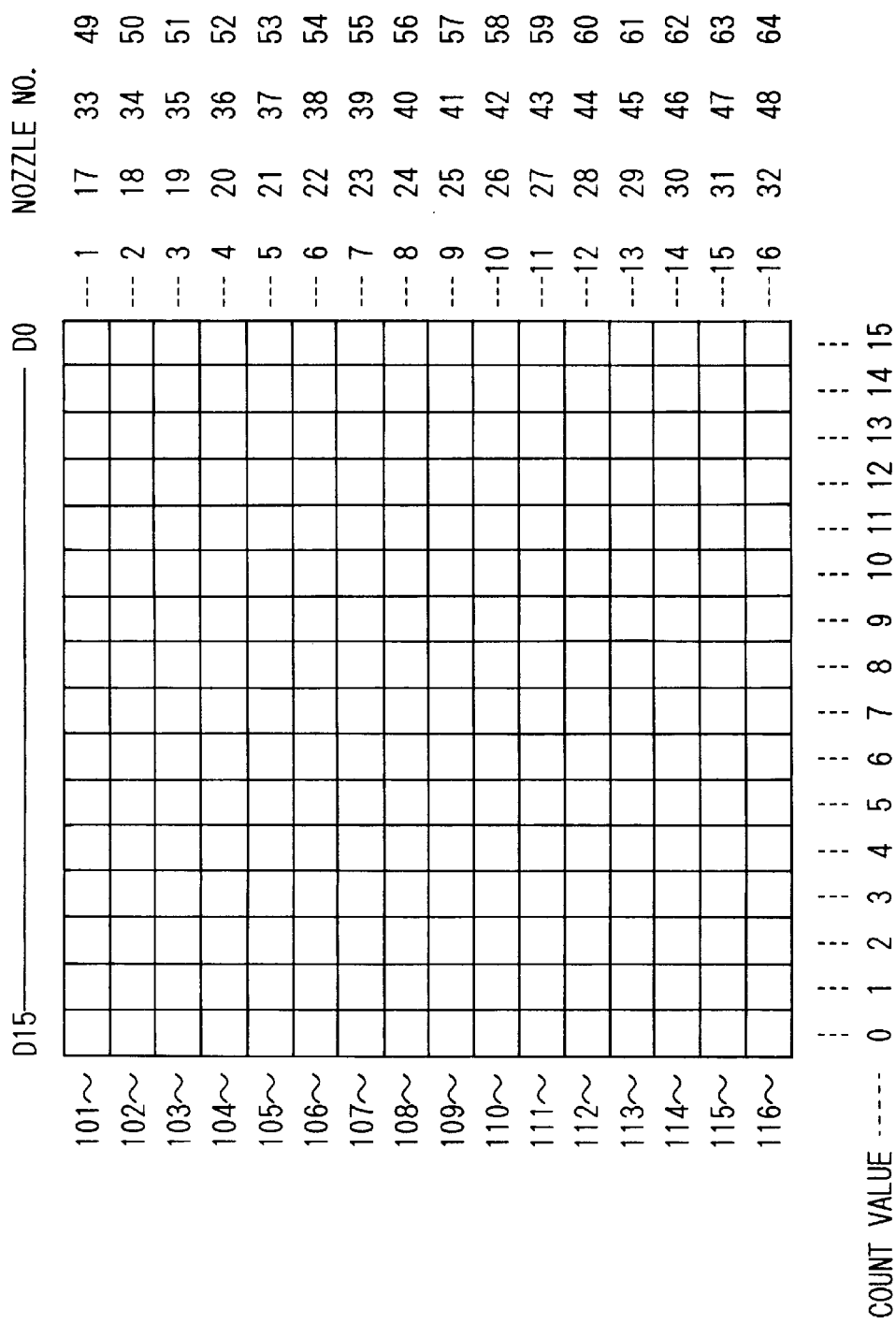
FIG. 5 shows a mask pattern used in the ink jet printer of the embodiment.

Numerals 101 to 106 denote a shift register comprising 16-bit flip-flops as shown in FIG. 5. The 16-bit data are set in those flip-flops 101 to 116 from the CPU 21 through a data bus. Numerals 201 to 216 denote 1-bit selectors (1 out of 16)

which select 1-bit data designated by a 4-bit selection signal 410 outputted from a 4-bit up/down counter 401, of the 16-bit data supplied from respective flip-flops and output them as output signals 301 to 316.

A relationship between the selection signal 410 which is the output of the counter 401 and the selected 1-bit of the registers 101 to 116 and a positional relationship to the nozzles of the recording head 6 are shown in FIG. 5. The direction signal a which is the output signal of the encoder detection circuit 34 shown in FIGS. 4-1 and 4-2 and the count pulse b are supplied to the up/down counter 401. As the carriage 5 is driven, the counter 401 is incremented by one by the count pulse b when the direction signal a is at a high level, and decremented by one when the direction signal a is at a low level.

The count pulse b has one-to-one correspondence to the drive timing of the recording head 9, and an enable signal 404 is outputted in synchronism with a fall of the count pulse b with a pulse width of T set in a timer 403 as shown in FIGS. 4-1 to 4-3. Data to be recorded is written into a 64-bit record data register 402 comprising flip-flops from the CPU 21 through the data bus. The record data register 402 is of 2-stage latch configuration so that the present drive of the recording head 6 is not affected even if the next data is written during the drive of the recording head 6. The 64-bit output signal from the record data register 402 are supplied to AND circuits 501 to 564 for each bit, and output signals 301 to 316 of data selectors 201 to 216 and a drive enable signal 404 are supplied to the respective AND circuits. Thus, the enable signal 404 is rendered high level and only the nozzles selected by the data selectors 201 to 216 can output the head drive pulse signals to the head drive unit 24 in accordance with the record data from the record data register 402.

In this configuration, each time the signal is inputted from the encoder 18, that is, each time the record position of the recording head 6 is switched, the output of the mask data stored in the flip-flops 101 to 116 is switched so that 16 bits×16 bits mask pattern is developed on the record sheet.

Figure 6:
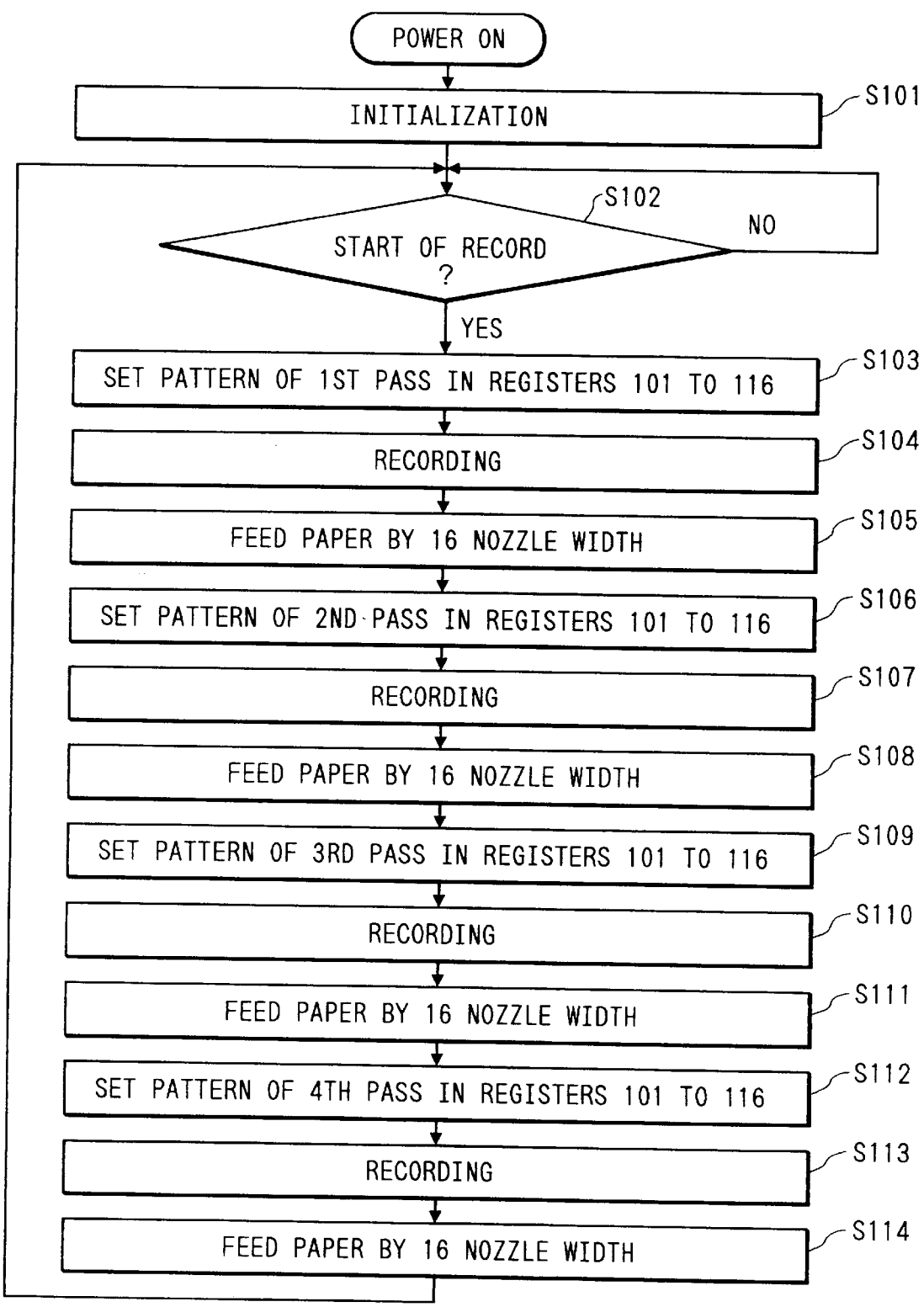
FIG. 6 shows a flow chart of an operation in the ink jet printer of the embodiment.
Figure 7:
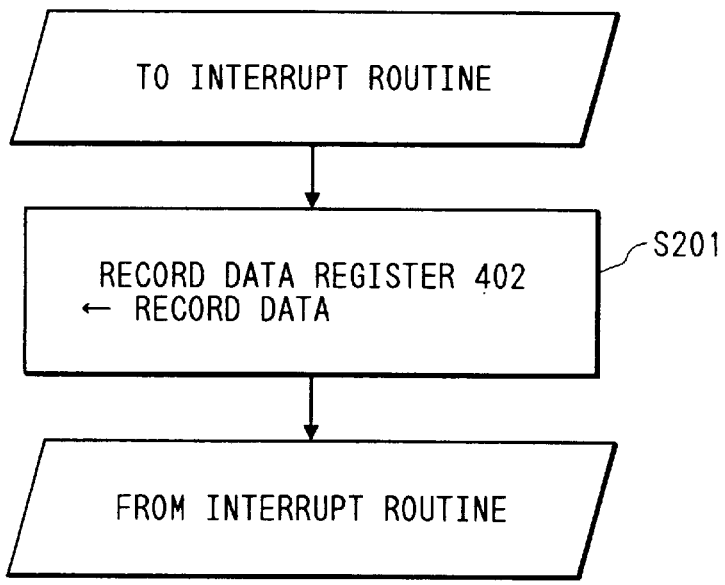
FIG. 7 shows a flow chart of an interruption process in the ink jet printer of the embodiment.

FIGS. 6 and 7 show flow charts of a control process in the ink jet printer of the present embodiment. Referring to those drawings, an operation of the present embodiment is now explained.

Figure 17:
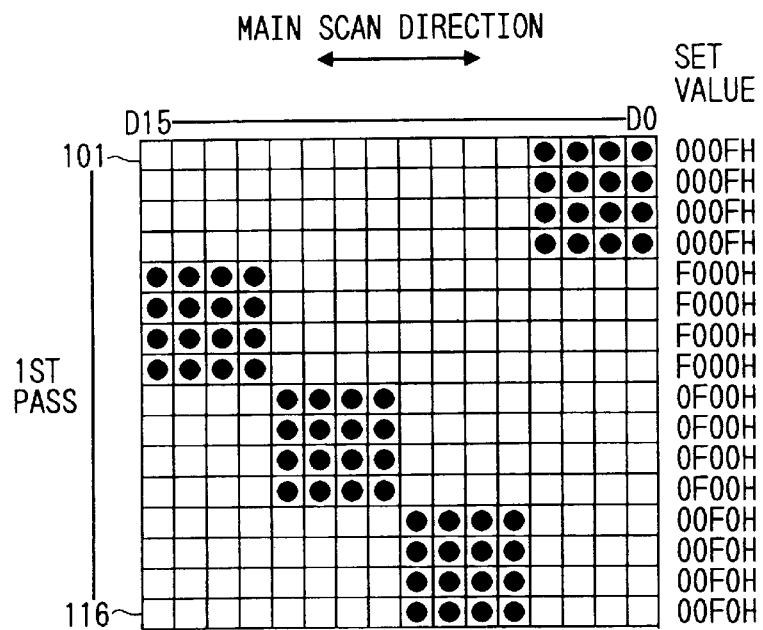
Figure 18:
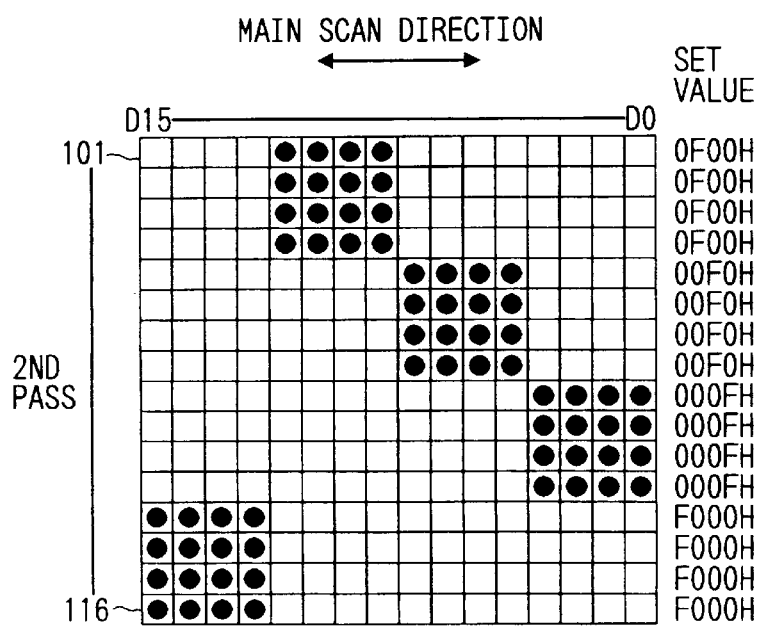
Figure 19:
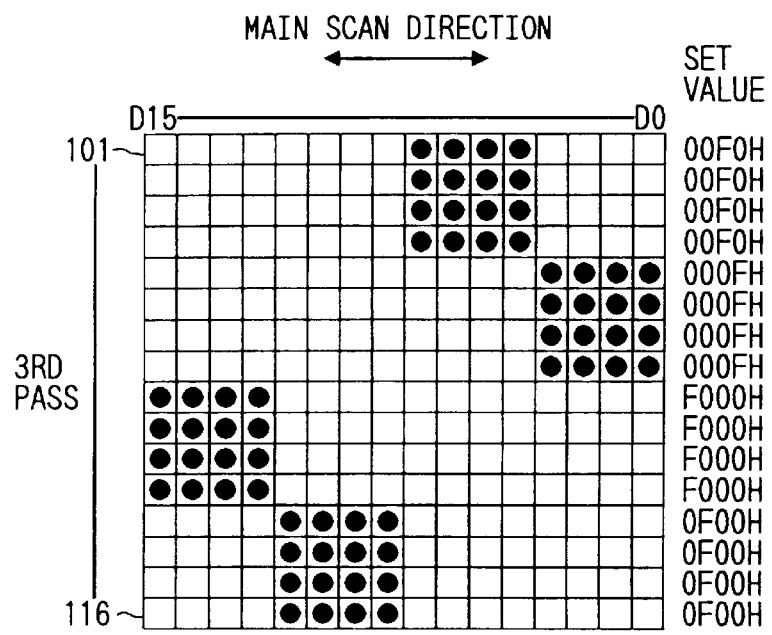
Figure 20:
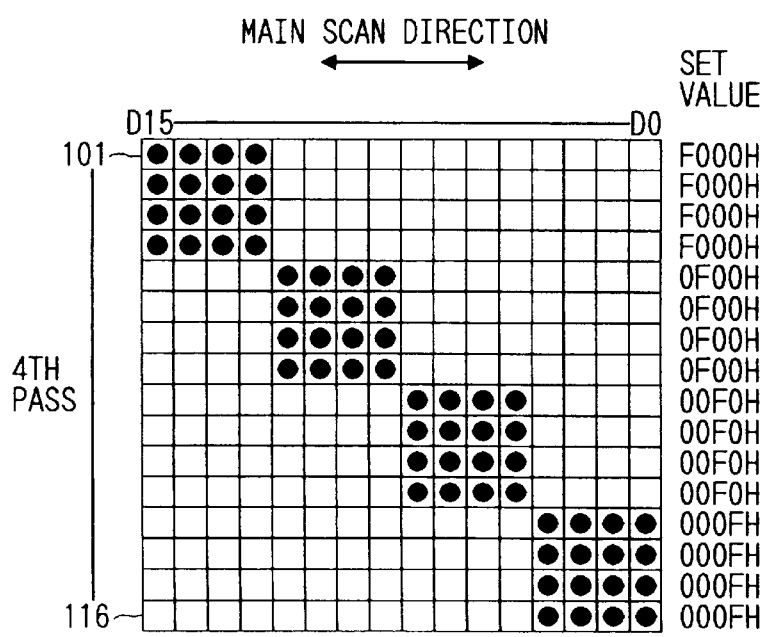

The mask patterns set in the registers 101 to 116 of the present embodiment are identical to the patterns shown in FIGS. 17 to and through four times of main scan using those mask patterns, the recording of 64-nozzle width by the recording head 6 is completed. In FIGS. 17 to 20, when the record data are at the black dot positions, the corresponding nozzles are driven by the record data, and at the position where no black dot is present, the corresponding nozzles are not driven regardless of the presence or absence of the record data. Thus, the drive of the record head 16 is masked. After one scan by the recording head 6 is completed, the record sheet is transported by 16-nozzle length along the sub-scan direction.

In the flow chart of FIG. 6, after the power-on of the apparatus, the apparatus is initialized in a step S101. The position counter 35 and the up/down counter 401 are cleared to "0" when the recording head 6 is at the home position. Thereafter, the count (position of the recording head 6) of the position counter 35 is updated each time it receives a rising edge of the count pulse output signal b of the rotary encoder 18 to indicate an absolute position. The count pulse signal b is supplied to the up/down counter 401 and the selection bit position of the data selectors 201 to 216 is changed by switching the count to change the mask pattern which is logically ANDed with the record data. In the initial setting, a time to determine the drive pulse width of the recording head 6 is set in the timer 403.

When a start of record command is inputted in a step S102, the process proceeds to a step S103 in which a first pass mask pattern shown in FIG. 17 is set in the registers 101 to 116. Namely, OOOFH is set in the registers 101 to 104, FOOOH is set in the registers 105 to 108, OFOOH is set in the registers 109 to 112, and OOFOH is set in the registers 113 to 116, where H represents a hexadecimal number. In a step S104, the carriage motor 7 is accelerated to a predetermined velocity which allows a recording and then switched to a constant speed, and when the count of the position counter 35 reaches a start of record position, the CPU 21 is enabled by interruption to start the record operation. Thus, the interruption occurs at the record dot interval and the interruption process shown in the flow chart of FIG. 7 is executed.

In the interruption process routine of FIG. 7, record data for 64 nozzles, that is four words is written into the record data register 402 in a step S201. Each time the record position is switched, the count of the up/down counter 401 is switched. The mask data selected by the count is logically ANDed with the output of the record data register 402 and it is outputted to the head drive unit 24 as the actual head drive pulse. In this manner, the logical AND data of the record data and the mask pattern is outputted to the recording head 6 for recording. After the recording of one scan by the recording head 6, the process proceeds to a step S105 in which the interruption is disabled and the record sheet is transported by 16-nozzle length.

Thereafter, in steps S106 to S114, mask patterns (FIGS. 18 to 20) corresponding to the respective passes are set in the registers 101 to 116 for recording as they are in the steps S103 to S105. When the recording for all of the four passes is completed and the recording of 64-nozzle width is over, the process returns to the step S102 and waits for the input of the next start of record command.

By this control, the load to the software is reduced and the recording can be made while the record data is masked by the 16×16-bit mask pattern for each scan of the recording head 6 with a simple construction, and the following advantages are accomplished:

(1) High quality recording with non-prominent white stripe and black stripe is attained.

(2) Since the ink transfer density in one scan can be reduced, the fixing of the ink to plain paper is improved.

(3) Since the mask registers 101 to 116 are updated for each scan of the recording head, the record position shift correction in the reciprocal recording is facilitated.

In the present embodiment, the number of nozzles of the recording head 6 is 64 vertically, and the mask pattern by the mask registers 101 to 116 is 16×16 bits, and the number of scans for recording the nozzle length of the recording head 6 is 4, although other numbers may be used.

In the present embodiment, the signal for switching the mask data outputted from the mask registers 101 to 116 is the count of the up/down counter 401 which is updated in accordance with the signal outputted from the rotary encoder 18. The count of the counter 401 may be updated by a signal from a linear encoder arranged along the main scan direction instead of the signal from the rotary encoder 18, or a trigger signal may be directly outputted to the counter 401 from the CPU 21.

The setting of the record data to the record data register 402 is conducted by the CPU 21 in the present embodiment although the present invention is not limited thereto. For example, the record data stored in the RAM 28 may be directly transferred to the record data register 402 by using a DMA function.

Figure 9:
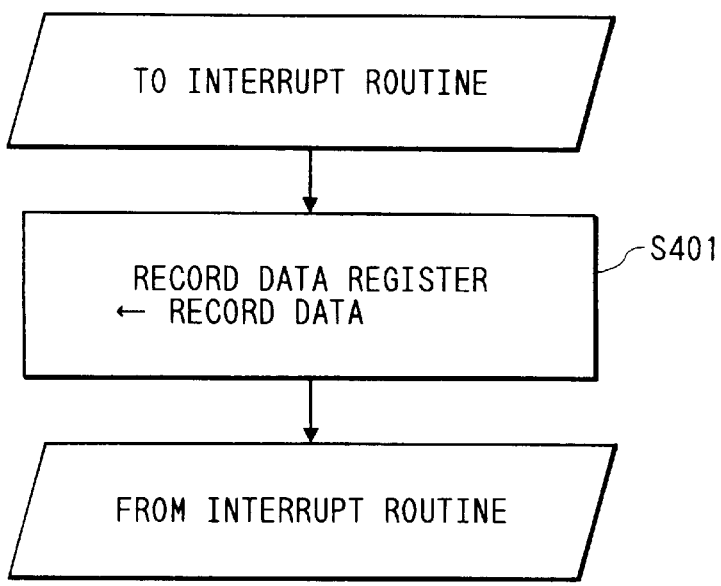
FIG. 9 shows a flow chart of an interruption process in the color ink jet printer of the other embodiment.

FIGS. 8 and 9 show flow charts of a control of the ink jet printer in other embodiment of the present invention. In the present embodiment, a recording head 6a of a color ink jet printer has four color heads of yellow, magenta, cyan and black.

In the present embodiment, a mask pattern of 16 bits×16 bits for storing the mask pattern is provided for each color, and the mask pattern to be used in one scan can be changed for each color. While the configuration is not shown, it is explained based on the configuration of the head control unit 23 of FIG. 1. The up/down counter 401 for selecting the corresponding bits of the mask pattern is common to the four colors, and other mask selectors 201 to 216, a record data register 402, a timer 403 for determining the head drive pulse width are provided for each color. Namely, black mask registers 101 to 116, cyan mask registers 121 to 136, magenta mask registers 141 to 156 and yellow mask registers 160 to 176 are provided. The configuration of the mask register for each color is identical to that of FIG. 5 shown in the previous embodiment. Except the configuration of the head control unit 23, the configuration is common to the previous embodiment and the explanation thereof is omitted.

In the flow chart of FIG. 8, after the power-on of the apparatus, the apparatus is initialized in a step S301. The position counter 35 and the up/down counter 401 are cleared when the recording head 6 is at the home position as it is in the previous embodiment. The time to determine the drive pulse width of the recording head 6 is set in the timer 403 provided for each color. When a start of record command is inputted in a step S302, the process proceeds to a step S303 in which first pass mask patterns (not shown) which are different from color to color are set in the registers 101 to 116, 121 to 136, 141 to 156 and 160 to 176. In a step S304, the carriage motor 7 is accelerated to a predetermined velocity which allows recording, and switched to a constant speed drive when the content of the position counter 35 reaches the record position, and the CPU 21 is interruption-enabled for recording.

In the interruption routine of FIG. 9, record data for 64 nozzles, that is, 4 words×4 colors are written into the record data registers 402 provided one for each color. Thus, each time the record position is switched, the count of the up/down counter 401 is updated and the mask data for the respective colors designated by the count are logically ANDed with the outputs of the corresponding record data registers 402 and they are outputted to the head drive unit 24 as the head drive pulses. When one scan of recording is over, the process proceeds to a step S305 in which the interruption is disabled and the record sheet is transported by 16-nozzle length.

Thereafter, in steps S306 to S314, mask patterns (not shown) which differ from pass to pass and from color to color are set in the registers 101 to 116, 121 to 136, 141 to 156 and 160 to 176 for recording before the start of scan of the respective passes, as they are in the first pass recording in the steps S303 to S305. When the recording of all four passes is over and the color images of 63-nozzle width for each color have been recorded, the process returns to the step S302 and waits for the start of record command for the next line.

By this control, the recording is accomplished with 16×16 bits masks which are different from color to color for each scan while reducing the load to the software. As a result, a printer which allows the high density and high speed recording is provided, which offers the following advantages:

(1) Since the order of fixing of the respective colors to the recording sheet may be changed, color tonality may be optimized.

(2) Since the density of ink deposited on the recording sheet in one scan, which is critical in the color recording, is lowered, the fixing of the ink to the recording sheet such as a plain paper is improved.

(3) The color irregularity is improved.

[Embodiment 2]

Other embodiment of the present invention is now explained. In the present embodiment, a color ink jet printer is used in which the record data is set from a RAM to the record data register independently for each color and each block by using the DMA function.

Figure 15:
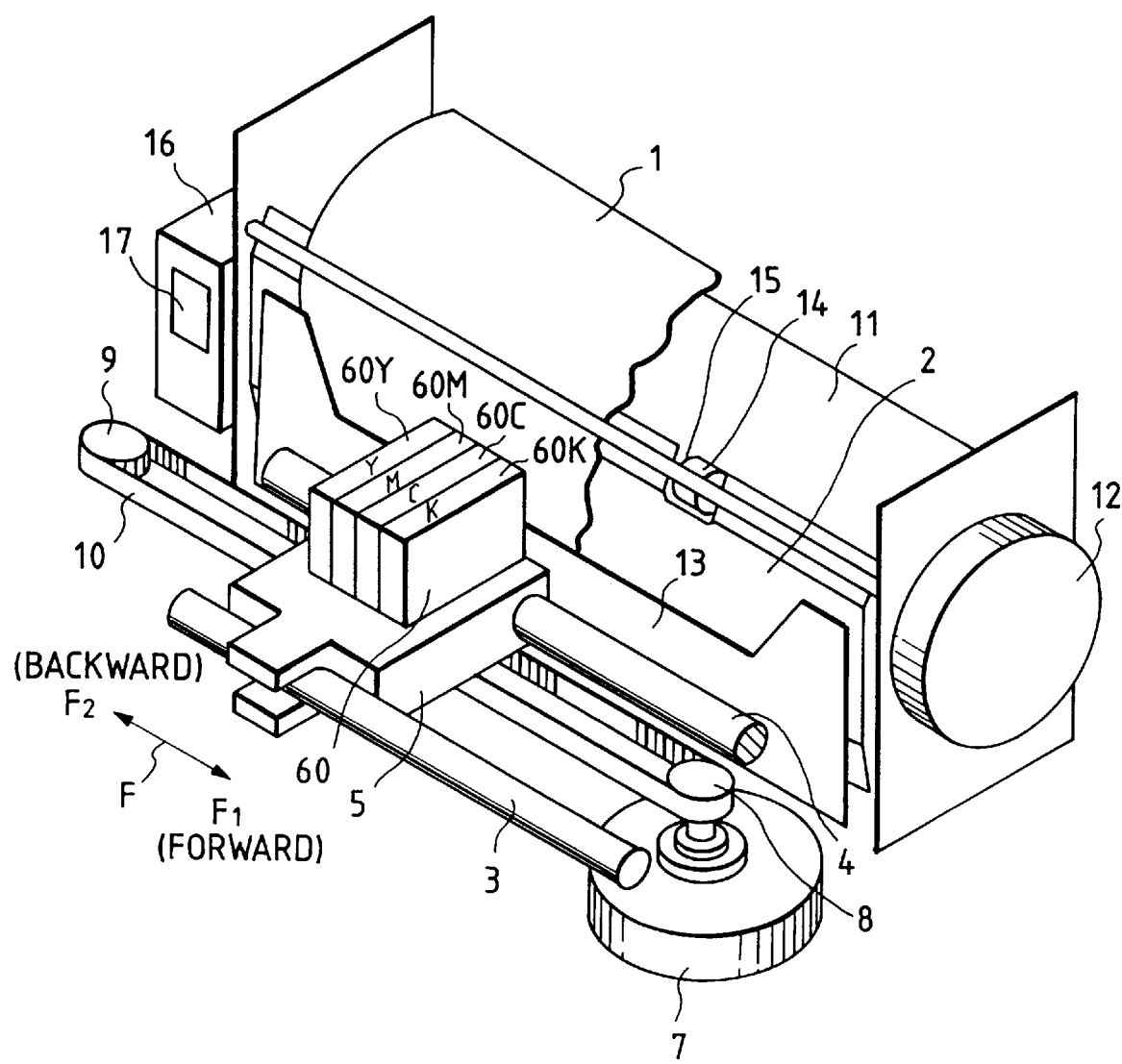

FIG. 15 shows a perspective view of the color ink jet printer of the present embodiment. The like numerals to those shown in FIG. 2 designate the like elements. Numeral 60 denotes a recording head unit having integrated color recording heads 60K, 60C, 60M and 60Y for black (K), cyan (C), magenta (M) and yellow (Y). Each recording head has a nozzle train comprising 64 nozzles arranged along the sub-scan direction. The recording heads of the respective colors are arranged in the order of K, C, M and Y along a direction $F_1$, and ink droplets deposit on the recording material (recording medium) in the order of K, C, M and Y in the forward run of the reciprocal movement of the carriage, and in the return run, ink droplets deposit in the reverse order of Y, M, C and K.

Figure 13:
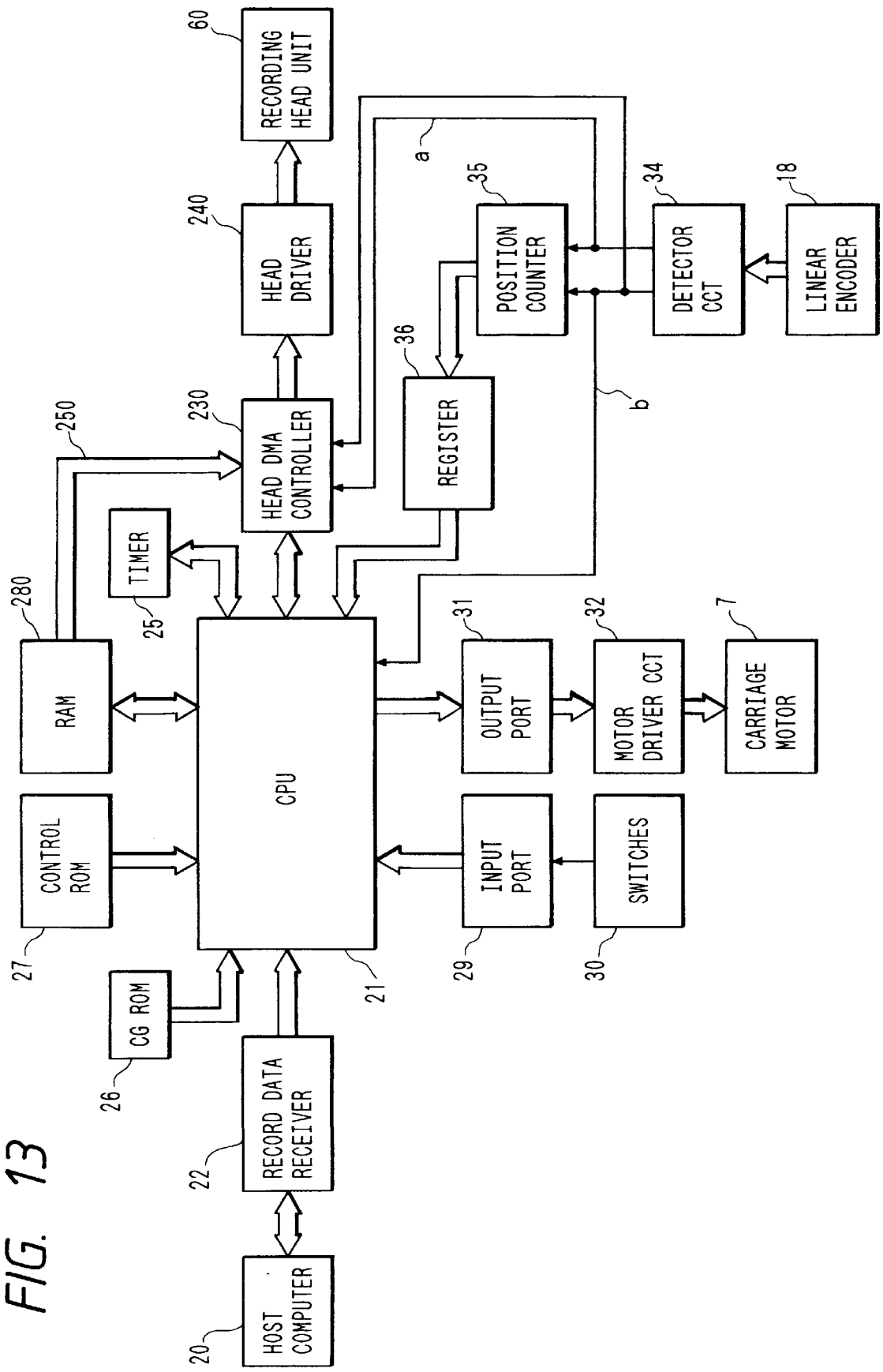
FIG. 13 shows a block diagram of an electrical configuration of a color ink jet printer.
Figure 14:
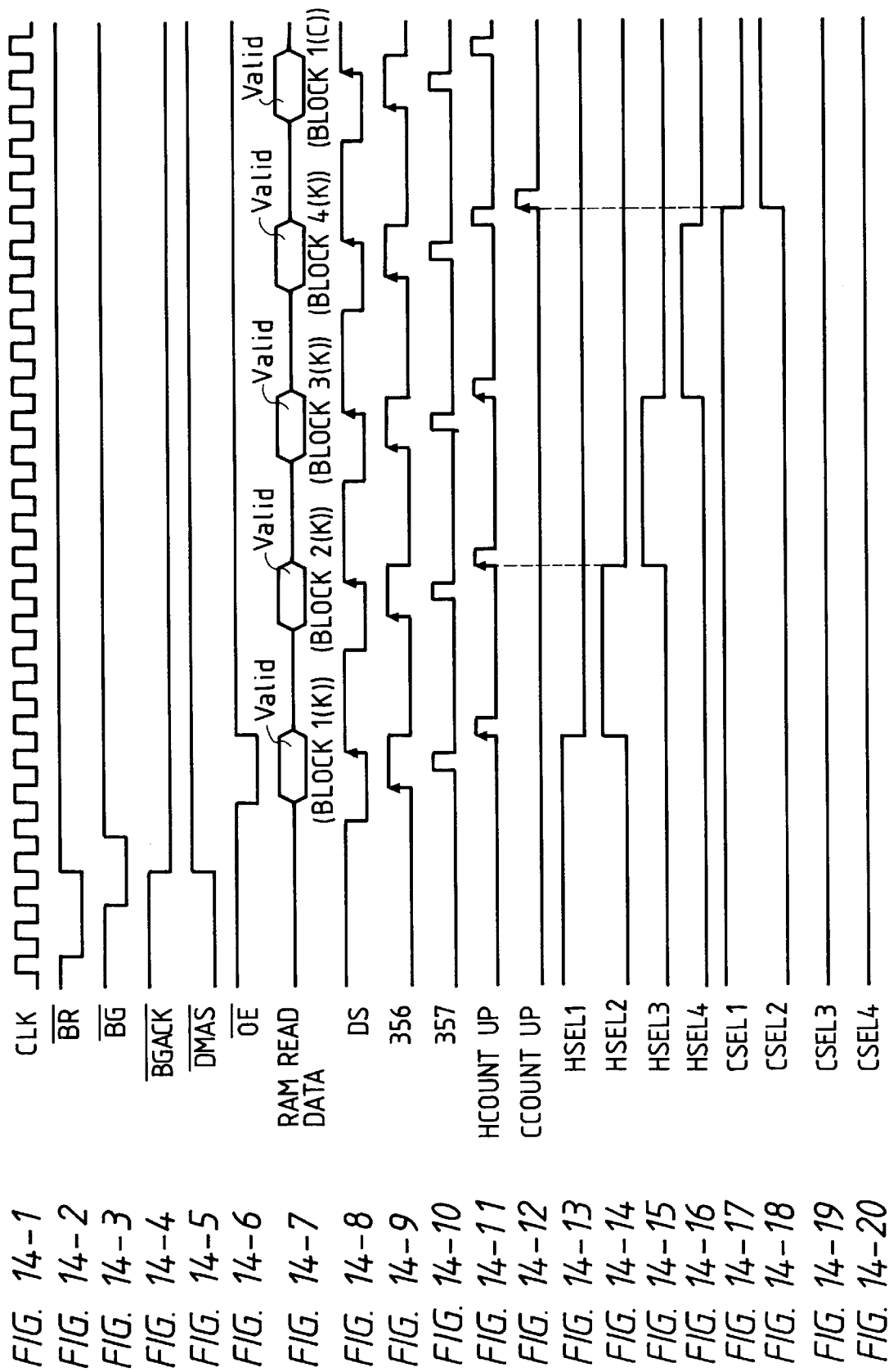

FIG. 13 shows a block diagram of an electrical configuration of the color ink jet printer shown in FIG. 15. The like numerals to those shown in FIG. 2 designate the like elements. Numeral 230 denotes a head DMA control unit having a function to transfer the record data directly to the record data register from the RAM 280 which stores the record data of the respective colors through the 16-bit data bus 250, by using the DMA function, and numeral 240 denotes a head drive unit for driving the recording heads of the respective colors in the recording head unit 60 in accordance with the record data of the respective colors set by the DMA control unit 230 and comprising drive units 240K, 240C, 240M and 240Y.

Figure 10:
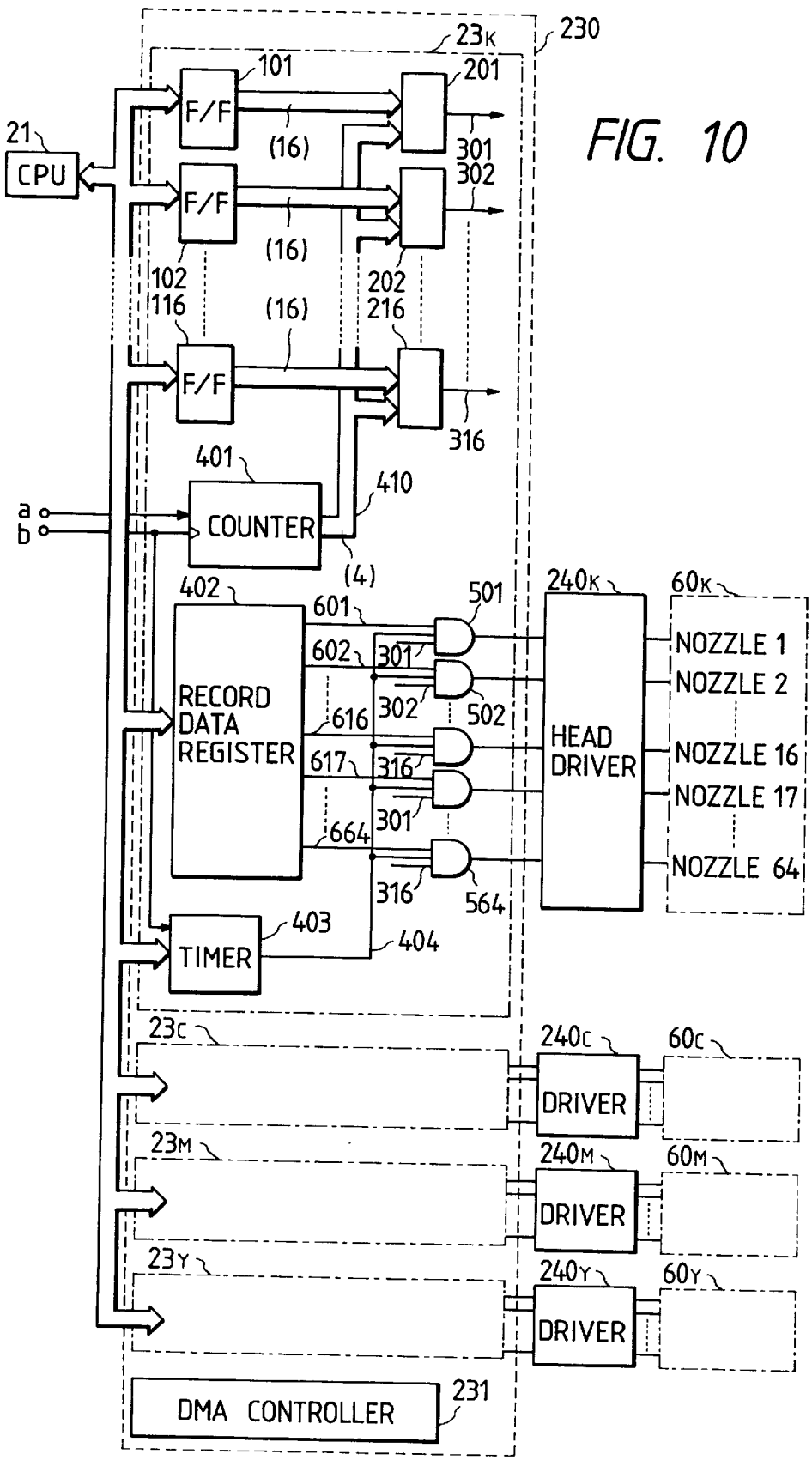
FIG. 10 shows a block circuit diagram of detail of a head DMA control unit.

FIG. 10 shows a block circuit diagram of detail of the head DMA control unit 230. In the present embodiment, since the recording heads for the four colors K, C, M and Y are provided, the head DMA control unit 230 comprises head control units 23K, 23C, 23M and 23Y of the same configuration as that of the head control unit 23 shown in FIG. 1, for the respective colors. It further comprises a DMA control unit 231 for controlling the DMA transfer of the data.

Figure 11:
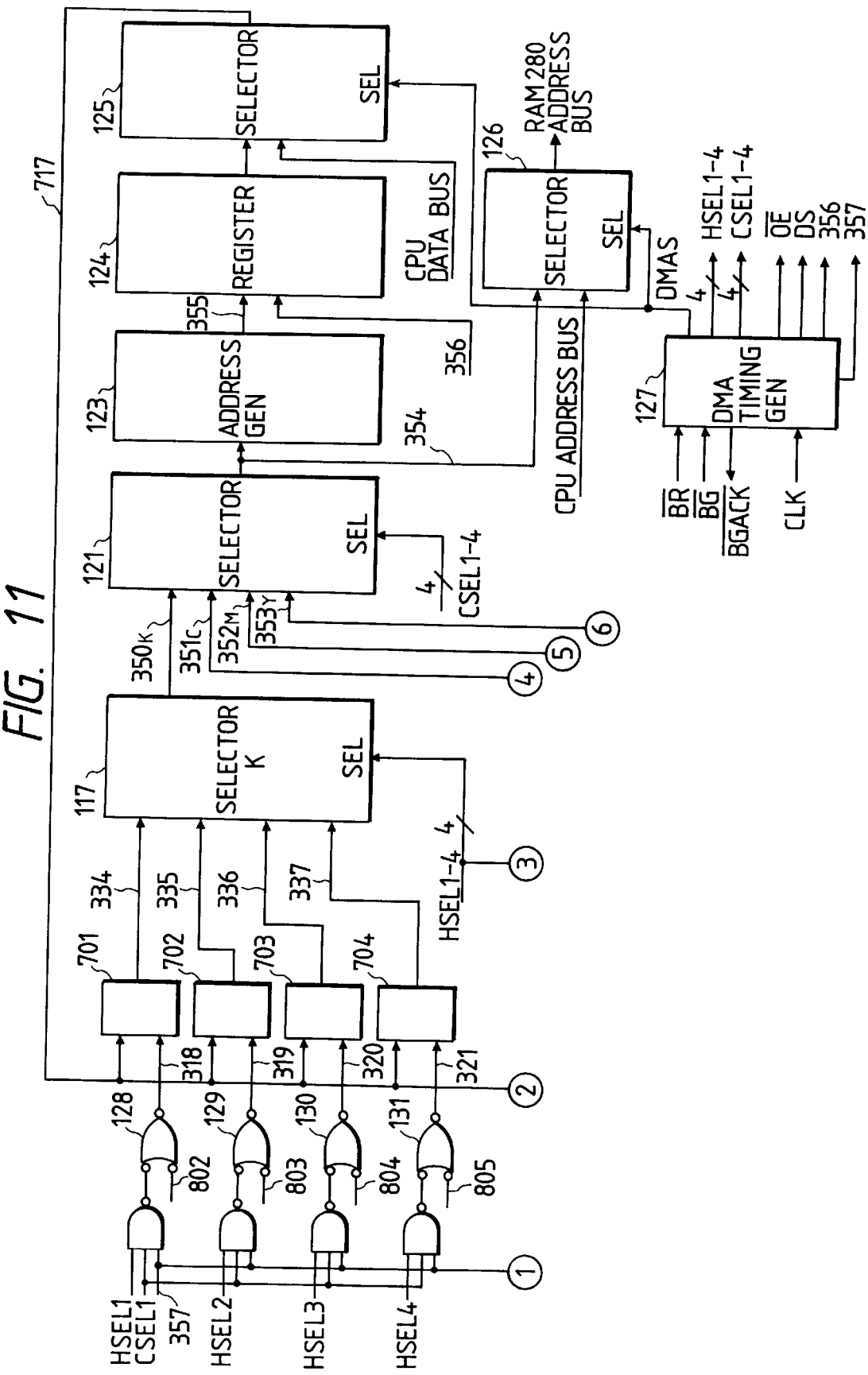
FIG. 11 shows a block circuit diagram of detail of a DMA control unit.
Figure 12:
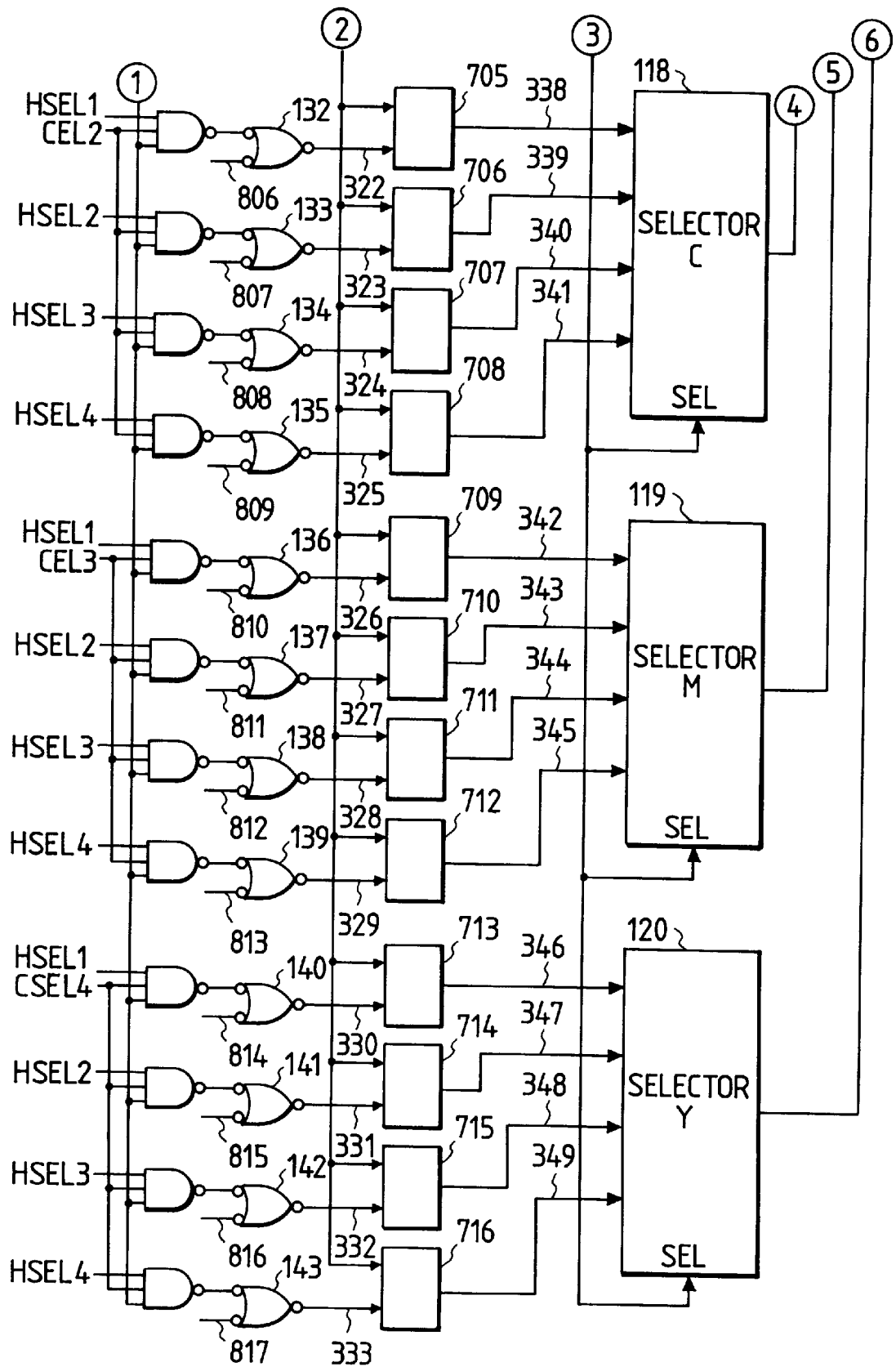
FIG. 12 shows a block circuit diagram of detail of the DMA control unit.
Figure 16:
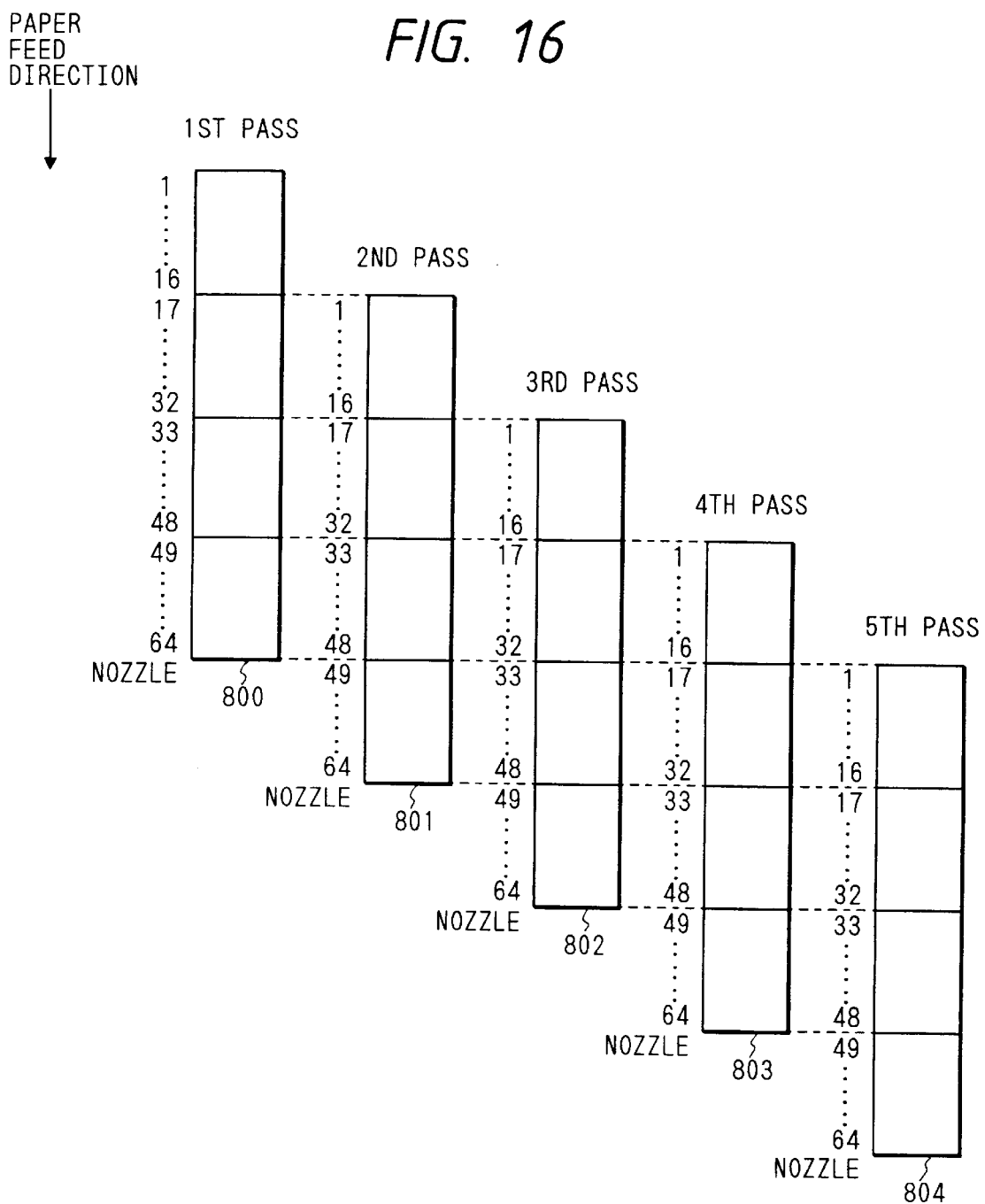

FIGS. 11 and 12 show block circuit diagrams of detail of the DMA control unit 231. Numerals 701 to 704 denote registers for dividing the 64 nozzles of the black head into 4 blocks as shown in FIG. 16 and setting the DMA start addresses of the print buffer in the RAM 280 corresponding to the respective blocks. Numeral 701 corresponds to the nozzles 1 to 16 (hereinafter referred to as a head block 1), numeral 702 corresponds to the nozzles 17–32 (hereinafter referred to as a head block 2), numeral 703 corresponds to the nozzles 33 to 48 (hereinafter referred to as a head block 3) and numeral 704 corresponds to the nozzles 49 to 64 (hereinafter referred to as a head block 4). Similarly, numerals 705 to 708, 709 to 712 and 713 to 716 denote registers for setting the DMA start addresses corresponding to the head blocks 1 to 4 of the cyan heads, the magenta heads and the yellow heads, respectively.

Numeral 117 denotes a selector for outputting a DMA start address corresponding to one of the blocks in accordance with a select signal (HSEL1 to 4) applied to the SEL terminal, of the DMA start addresses corresponding to the four blocks of the black heads set in the registers 701 to 704. Similarly, numeral 118 denotes a selector for outputting one of the DMA start addresses corresponding to the four blocks of the cyan heads set in the registers 705 to 708, numeral 119 denotes a selector for outputting an address corresponding to one of the DMA start addresses corresponding to the four blocks of the magenta heads set in the registers 709 to 712, and numeral 120 denotes a selector for outputting an address corresponding to one of the DMA start addresses corresponding to four blocks of the yellow heads set in the registers 713 to 716.

Numeral 121 denotes a selector for outputting a DMA start address of one color in accordance with the color select signal (CSEL1 to 4) applied to the SEL terminal, of the DNA start addresses of the respective colors outputted from the selectors 117 to 120.

Numeral 123 denotes an address generator for incrementing the DMA start address outputted from the selector 121 by +8 in the forward print run and decrementing it by −8 in the return print run, numeral 124 denotes a register for latching the address data generated by the address generation circuit 123 in accordance with a latch signal 356, and numeral 125 denotes a selector for selecting the address data set in the registers 701 to 716 in accordance with a select signal applied to the SEL terminal and outputting the address data stored in the register 124 in the DMA transfer mode and outputting the address data from the data bus of the CPU 21 in other than the DMA transfer mode.

Numeral 126 denotes a selector for selecting the data outputted to the address bus of the RAM 280 in accordance with the select signal applied to the SEL terminal and outputting the DMA start address outputted from the selector 121 in the DMA transfer mode and outputting the data of the address bus of the CPU 21 in other than the DMA transfer mode.

Numeral 127 denotes a DMA transfer timing generation circuit for generating various timing signals for the DMA transfer. BR denotes a signal for requesting the release of the bus for the DMA transfer to the CPU 21. In response to the signal BR, the CPU 21 outputs signal indicating the permission to release the bus to the DMA transfer timing generation circuit 127, which, when it receives a signal BG, outputs a signal GBACK to the CPU 21 to inform the setting of the DMA transfer mode.

The DMA transfer timing generation circuit 127 further outputs select signals HSEL1 to 4 for selecting the corresponding block of the data to be DMA transferred and the select signals CSEL1 to 4 for selecting the color to the registers and the selectors. When HSEL1 is high level "H", the block 1 is selected, when HSEL2 is high level "H", the block 2 is selected, when HSEL3 is high level "H", the block 3 is selected, and when HSEL4 is high level "H", the block 4 is selected. When CSEL1 is "H", the black is selected, when CSEL2 is "H", the cyan is selected, when CSEL3 is "H", the magenta is selected and when CSEL4 is "H", the yellow is selected.

The DMA transfer circuit 127 outputs a permission signal OE for reading the data to the RAM 280 and outputs a signal DS for setting the data to the record data register of the head control units 23K, 23C, 23M and 23Y.

The DMA transfer timing generation circuit 127 also outputs a signal 356 for latching the address data to the register 124 and a signal 357 for writing the address data to the registers 701 to 716.

Those signals are outputted at the timing synchronized with the clock signal CLK.

FIGS. 14-1 to 14-20 show timing charts of various signals of the DMA control unit 231 shown in FIGS. 11 and 12.

After the start of the recording operation, when the DMA timing generation circuit 127 detects that the carriage 5 has reached a predetermined position based on the output from the position counter 35, it outputs a low level "L" signal BR to the CPU 21 to request to release the bus for the DMA transfer. When it receives the low level "L" signal BG from the CPU 21, it outputs a low level "L" signal BGACK to the CPU 21 to inform to the CPU 21 of the setting of the DMA transfer mode and sets the signal DMAS for the selectors 125 and 126 to the high level "H". The selector 125 thus selects the register 124. The selector 126 selects the output 354 from the selector 121 and outputs it to the address bus of the RAM 280. The signal BGACK is kept at the low level "L", until the record data of the 64 nozzles of the respective colors are transferred, and the signal DMAS is kept at the high level "H" until the record data of the 64 nozzles of the respective colors are transferred.

The CPU 21 outputs the RAM start address for the DMA transfer of the respective colors through the data bus before the DMAS is rendered high level "H" for each main scan. The start address is outputted to the registers 701 to 716 from the selector 125 through a signal line 717 and the DMA start address is set in the respective registers for each main scan.

Write trigger signals 318 to 333 of the respective registers are outputted from AND circuits 128 to 143 in accordance with write strobe signals 802 to 817 derived from the control signal of the CPU 21 and the address stored in the data bus or the register 124 is written into the respective registers at a rising edge of the write trigger signals 318 to 333.

The DMA start address outputted from the CPU 21 is set in the registers 701 to 716. The signals HSEL1 and CSEL1 from the DMA timing generation circuit 127 are initially set to the high level "H", respectively. Accordingly, the signal line 334 is first selected by the selector 117 and the address data set in the register 701 is outputted to the signal line 350. The selector 121 selects the signal line 350 and the address data set in the register 701 is outputted to the address bus of the RAM 280 through the selector 126. Thus, the record data corresponding to the block 1 of the black head is DMA transferred from the RAM 280 while the signal OE is at the low level "L" and it is set in the record data register 402 at the rise of the signal DS from the DMA timing generation circuit 127.

The output from the selector 121 is also outputted to the address generation circuit 123 and the address data is incremented by +8 in the forward print run and decremented by −8 in the return print run, and the result is set in the register 124 at the rise of the signal 356. It is then sent to the register 701 as the address data for the next DMA transfer through the selector 125 and the signal line 717 and set at the rise of the signal 357. Each address of the RAM 280 consists of one byte. Accordingly, 8 bytes or 8 address storage areas are required to store the 64-nozzle data. Accordingly, +8 increment or −8 decrement is effected for the generation of the next address data.

The DMA timing generation circuit 127 has a counter HCOUNT for counting up each time the DMA transfer is effected for each block, and a counter CCOUNT for counting up each time the DMA transfer is effected for four blocks. In response to the counting of the counter HCOUNT, the signals HSEL1 to 4 are rendered to the high level "H" in the order of HSEL1→HSEL2→HSEL3→HSEL4→HSEL1→•••. In response to the counting of the counter CCOUNT, the signals CSEL1 to 4 are rendered to the high level "H" in the order of CSEL1→CSEL2→CSEL3→CSEL4→CSEL1→•••.

Accordingly, when the DMA transfer is effected for the data corresponding to the block 1 of the black heads, the counter HCOUNT is counted up to render HSEL1 to the low level "L" and HSEL2 to the high level "H". Thus, the selector 117 selects the signal line 335 so that the address data set in the register 702 is outputted. The address data is outputted to the address bus of the RAM 280 through the selectors 121 and 126 and the record data corresponding to the block 2 of the black heads is DMA transferred and set in the record data register 402. Similarly, the data corresponding to the block 3 and the block 4 of the black heads are DMA transferred. The counter CCOUNT counts up. As a result, CSEL1 is rendered to the low level "L" and CSEL2 is rendered to the high level "H". Thus, the selector 121 selects the signal line 351 and the registers 705 to 708 are sequentially selected in accordance with HSEL1 to 4 as they are for the black heads, so that the data corresponding to the blocks 1 to 4 of the cyan heads are DMA transferred and set in the record data register 402 corresponding to the cyan heads.

When the data corresponding to the blocks 1 to 4 of the cyan heads are DMA transferred, the counter CCOUNT is counted up so that CSEL2 is rendered to the low level "L" and CSEL 3 is rendered to the high level "H". Thus, the selector 121 selects the signal line 352. The registers 709–712 are sequentially selected in accordance with HSEL1 to 4 as they are for the black heads so that the data corresponding to the blocks 1 to 4 of the magenta heads are DMA transferred and set in the record data register 402 corresponding to the magenta heads. The counter CCOUNT is counted up so that CSEL3 is rendered to the low level "L" and CSEL4 is rendered to the high level "H". Thus, the selector 121 selects the signal line 353. The registers 713–716 are sequentially selected in accordance with HSEL1 to 4 as they are for the black heads and the data corresponding to the blocks 1 to 4 of the yellow heads are DMA transferred and set in the record data register 402 corresponding to the yellow heads.

As described above, after the data of each color of each block has been transferred, the registers 701–716 which indicate the DMA address are incremented by +8 to set the next DNA address.

The above operation is repeated until the end of one main scan. The data which was DMA transferred from the RAM 280 is logically ANDed with the data generated by the mask setting means so that the recording is effected at the timing adopted to the movement of the carriage, as it is in the previous embodiment. Namely, the DMA transferred record data is recorded while it is masked by the data generated by the mask setting means for each color and each block.

When the next main scan is started, a similar operation is effected. As described above, the nozzle trains of the recording heads of the respective colors are divided into the same number of blocks as the maximum number of print passes and the registers for setting the read start address of the RAM 280 for each color and block are provided and the record data are sequentially DMA transferred from each start address for each block in accordance with the detection of position of the carriage by the linear encoder. Thus, the throughput can be improved without increasing the load of the software.

In the present embodiment, the recording head of the ink jet type which forms flying ink droplets by using the thermal energy, and the recording apparatus using the same have been described.

The typical construction and the operational principles are preferably the ones disclosed in U.S. Pat. Nos. 4,723,129 and 4,740,796. The principle and the structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the generation, development and contraction of the bubbles, the liquid (ink) is ejected through an discharge port to produce at least one droplet.

The driving signal is preferably in the form of pulse because the development and the contraction of the bubbles can be effected instantaneously, and therefore the liquid (ink) is ejected with fast response. The driving signal is preferably such as those disclosed in U.S. Pat. Nos. 4,463,359 and 4,345,262. In addition, the temperature rise rate of the heating surface is preferably such as those disclosed in U.S. Pat. No. 4,313,124.

The structure of the recording head may be those shown in U.S. Pat. Nos. 4,558,333 and 4,459,600 in which the heating portion is disposed at a bent portion, as well as the structure of the combination of the ejection outlet, liquid passage and the electro-thermal transducer (linear liquid passage or orthogonal liquid passage) disclosed in the above-mentioned patents.

In addition, the present invention is applicable to the structure disclosed in Japanese Laid-Open Patent Application No. 59-123670 in which a common slit is used as the discharge port for a plurality of electro-thermal transducers, and the structure disclosed in Japanese Laid-Open Patent Application No. 59-138461 in which an opening for absorbing a pressure wave of thermal energy is formed corresponding to the discharge port.

The present invention is applicable to a full-line type recording head having a length corresponding to the maximum recording width. Such a recording head may comprises a single recording head or plural recording heads combined to cover the maximum width.

In addition, the present invention is applicable to a replaceable chip type recording head which is connected electrically with the apparatus and can be supplied with the ink when it is mounted in the main assembly, or to a cartridge type recording head having an integral ink container.

The provision of the recovery means and/or the auxiliary means for the preliminary operation are preferable because they further stabilize the effects of the present invention. As for such means, there are capping means for the recording head, cleaning means therefor, pressurizing or suction means, preliminary heating means which may be an electro-thermal transducer, an additional heating element or a combination thereof. Also, means for effecting preliminary discharge (not for the recording) may stabilize the recording operation.

The present invention is effectively applicable to an apparatus having at least one of a monochromatic mode mainly with black, a multi-color mode with different color inks and/or full color mode using the mixture of colors, which may be an integrally formed recording unit or a combination of a plurality of recording heads.

Furthermore, in the foregoing embodiments, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable discharge in a conventional recording apparatus of this type, the ink may be such that it is liquid within the temperature range when the recording signal is applied.

In addition, the present invention is applicable to other types of ink. In one of them, the temperature rise due to the thermal energy is positively prevented by consuming it for the state change of the ink from the solid state to the liquid state. Other ink is solidified when it is left unused, to prevent the evaporation of the ink. In any case, upon the application of the recording signal producing thermal energy, the ink is liquefied, and the liquefied ink may be discharged. Other ink may start to be solidified at the time when it reaches the recording sheet. The present invention is also applicable to the ink which is liquefied by the application of the thermal energy. Such ink may be retained in liquid state or solid state in holes or recesses formed in a porous sheet as disclosed in Japanese Laid-Open Patent Application No. 54-56847 and Japanese Laid-Open Patent Application No. 60-71260. The sheet is faced to the electro-thermal transducers. The most effective one of the inks described above is the film boiling system.

The ink jet recording apparatus may be used as built-in or stand-alone image output terminal of an information processing apparatus such as a word processor or a computer or the like, as a copying machine combined with an image reader or the like, or as a facsimile machine having information sending and receiving functions.

The present invention may be applicable to either a system comprising a plurality of units or an apparatus comprising a single unit. The present invention is also applicable when a program for executing the present invention is applied to the system or apparatus.

In accordance with the embodiments of the present invention, the following advantages are offered.

(1) The mask processing with less load to the software is attained and the recording with the high speed and high effective recording speed is attained.

(2) The high quality recording with less prominent white stripe and black stripe is attained.

(3) Since the recording with reduced ink density is attained, the fixing of the ink to the recording medium such as plain paper is improved.

(4) Since the order of recording by the recording elements for the respective colors may be changed by the mask data, the color tonality is optimized and the color irregularity is improved.

What is claimed is:

1. A recording apparatus for recording an image according to recording data on a recording medium by performing a record scan in a main scan direction with a recording head, said recording head having a plurality of recording elements arranged in a direction different from the main scan direction, said recording elements being driven in a time-division manner in units of a block of a predetermined number of recording elements, said recording apparatus comprising:

scanning means for moving said recording head, in the main scan direction, relatively to the recording medium to perform the record scan, said scanning means performing the record scan on a predetermined area of the recording medium a plurality of times to sequentially record thinned images, in respective record scans with the thinned images not overlapping each other, thereby completing an image on the predetermined area;

mask data generating means for generating mask data corresponding to the block, said mask data being for masking record data in accordance with the thinned images, said mask data generating means generating plural sets of mask data in accordance with the thinned images;

signal generation means for generating a record timing signal in accordance with the record scan by said scanning means;

selection means for sequentially selecting one mask data from the plural sets of mask data in accordance with the record timing signal; and drive means for driving said recording head in a time division manner in units of a block in accordance with data obtained by a logical product of record data and the mask data selected by said selection means, the mask data being commonly used for the blocks of said recording head.

2. A recording apparatus according to claim 1, wherein the mask data comprises plural bits, and said selection means includes a counter for counting the record timing signal and a selector for sequentially selecting a predetermined one of the plural bits of mask data in accordance with a content of said counter.

3. A recording apparatus according to claim 1, wherein said recording head comprises an ink jet recording head for recording by discharging ink.

4. A recording apparatus according to claim 3, wherein said ink jet recording head comprises an electrothermal converting member, and forms bubbles in ink by thermal energy generated from said electrothermal converting member to thereby eject ink droplets.

5. A recording apparatus for recording an image according to record data on a recording medium by performing a record scan in a main scan direction with a recording head, said recording head having a plurality of recording elements arranged in a direction different from the main scan direction, the recording elements being driven in units of a block of a predetermined number of elements, said apparatus comprising:

scanning means for moving said recording head in the main scan direction, relatively to the recording medium to perform the record scan, said scanning means performing the record scan on a predetermined area of the recording medium a plurality of times to sequentially record thinned images, in respective record scans with the thinned images not overlapping each other, thereby completing an image on the predetermined area;

storage means for storing the record data;

setting means for setting a read address of the data of said storage means corresponding to each block;

DMA control means for DMA transferring the record data from said storage means to register means for each block in accordance with the address set by said setting means;

mask data generating means for generating mask data corresponding to the block, said mask data being for masking record data in accordance with the thinned images, said mask data generating means generates plural sets of mask data in accordance with the thinned images;

signal generation means for generating a record timing signal in accordance with the record scan by said scanning means;

selection means for sequentially selecting one mask data from the plural sets of mask data in accordance with the record timing signal; and drive means for driving said recording head in a time-division manner in units of a block in accordance with data obtained by a logical product of record data and the mask data selected by said selection means, the mask data being commonly used for the blocks of said recording head.

6. A recording apparatus according to claim 5, wherein said recording head includes a plurality of recording element arrays for different recording colors and said setting means being capable of setting the read address of each recording color and each block.

7. A recording apparatus according to claim 5, wherein said recording head records by discharging ink droplets.

8. A recording apparatus according to claim 7, wherein said recording head comprises an electrothermal converting member, and forms bubbles in ink by thermal energy generated from said electrothermal converting member to thereby eject ink droplets.

* * * * *

UNITED STATES PATENT AND TRADEMARK OFFICE
CERTIFICATE OF CORRECTION

PATENT NO. : 6,027,197
DATED : February 22, 2000
INVENTOR(S) : Yoshiaki Kaburagi et al.

It is certified that error appears in the above-identified patent and that said Letters Patent is hereby corrected as shown below:

Title page,
Item [56], References Cited, under U.S. PATENT DOCUMENTS:

Insert: 5,146,554  9/1992  Statt --;
        5,434,602  6/1995  Kaburagi et al. --; and
        5,483,358  1/1996  Sugiura et al. --; and Insert after FOREIGN PATENT DOCUMENTS
        61-015460  1/1986  Japan

-- OTHER PUBLICATIONS

European Patent Office Communication, 9/1997 --.

Column 1,
Line 57, "(L=4, L$\geq$22" should read -- (L=4, L$\geq$2 --.

Column 5,
Line 46, "FIGS. 17 to" should read -- FIGS. 17 to 20 --.

Column 7,
Line 4, "other" should read -- another --; and
Line 64, "bits" should read -- bit --.

UNITED STATES PATENT AND TRADEMARK OFFICE
CERTIFICATE OF CORRECTION

PATENT NO. : 6,027,197
DATED : February 22, 2000
INVENTOR(S) : Yoshiaki Kaburagi et al.

It is certified that error appears in the above-identified patent and that said Letters Patent is hereby corrected as shown below:

Column 12,
Line 16, "an" should read -- a --; and
Line 43, "comprises" should read -- comprise --.

Signed and Sealed this

Eighteenth Day of December, 2001

Attest:

Attesting Officer

JAMES E. ROGAN
Director of the United States Patent and Trademark Office